(12) United States Patent
Jo et al.

(10) Patent No.: US 12,528,326 B2
(45) Date of Patent: Jan. 20, 2026

(54) MOUNT BUSHING

(71) Applicant: DTR Automotive Corporation, Ulsan (KR)

(72) Inventors: Woo Seon Jo, Yangsan-si (KR); Suk Dong Jang, Yangsan-si (KR); Dong Hyeon Yoo, Yangsan-si (KR)

(73) Assignee: DN AUTOMOTIVE CORPORATION (KR)

( * ) Notice: Subject to any disclaimer, the term of this patent is extended or adjusted under 35 U.S.C. 154(b) by 313 days.

(21) Appl. No.: 17/689,239

(22) Filed: Mar. 8, 2022

(65) Prior Publication Data

US 2022/0281283 A1 Sep. 8, 2022

(30) Foreign Application Priority Data

Mar. 8, 2021 (KR) .................. 10-2021-0030260

(51) Int. Cl.
*B60G 21/055* (2006.01)
*F16C 17/10* (2006.01)

(52) U.S. Cl.
CPC .......... *B60G 21/0551* (2013.01); *F16C 17/10* (2013.01); *B60G 2204/1222* (2013.01); *B60G 2204/41* (2013.01)

(58) Field of Classification Search
CPC .................................................. F16F 1/3828
USPC .............................. 267/141.1, 141.2, 141.4
See application file for complete search history.

(56) References Cited

U.S. PATENT DOCUMENTS

| | | | | |
|---|---|---|---|---|
| 4,889,328 A | * | 12/1989 | Uno | F16F 13/22 |
| | | | | 267/293 |
| 5,031,885 A | * | 7/1991 | Schwerdt | F16F 1/387 |
| | | | | 267/281 |
| 7,748,689 B2 | * | 7/2010 | Thibault | F16F 1/3807 |
| | | | | 267/293 |
| 9,279,473 B2 | * | 3/2016 | Matsushita | F16F 13/1463 |
| 2004/0060789 A1 | | 4/2004 | Hamada | |
| 2014/0103588 A1 | | 4/2014 | Firla | |

FOREIGN PATENT DOCUMENTS

| | | | |
|---|---|---|---|
| CN | 204061676 U | | 12/2014 |
| CN | 208277838 U | * | 12/2018 |
| CN | 109281972 A | | 1/2019 |
| CN | 208885839 U | * | 5/2019 |
| DE | 102006059475 A1 | | 8/2008 |
| JP | 01164833 A | * | 6/1989 |

(Continued)

*Primary Examiner* — Melody M Burch
(74) *Attorney, Agent, or Firm* — Park & Associates IP Law Office

(57) ABSTRACT

A mount bushing is proposed. The mount bushing is configured to minimize frequency shifting according to difference of dynamic properties applied by a load input to a mount. The mount bushing includes an outer tube, an inner tube provided in the outer tube, a rubber part provided between the outer tube and the inner tube, a tubular mass provided in the rubber part and having an opening formed by partially penetrating an outer circumferential surface thereof, and a stopper shaped to protrude outward from the inner tube to pass through the opening of the tubular mass, wherein the mount bushing is configured to minimize mutual interference between the mass and the stopper in deformation due to an external force.

4 Claims, 9 Drawing Sheets

(56) References Cited

FOREIGN PATENT DOCUMENTS

| | | |
|---|---|---|
| JP | 2004211805 A | 7/2004 |
| KR | 101339261 B1 | 12/2013 |
| KR | 1020140132446 A | 11/2014 |
| KR | 1020200138399 A | 12/2020 |

* cited by examiner

MOUNT BUSHING

REFERENCE TO RELATED APPLICATIONS

This application claims the priority benefit of Korean Patent Application No. 10-2021-0030260 filed on Mar. 8, 2021, the entire contents of which are incorporated herein by reference.

FIELD OF THE INVENTION

The present disclosure relates generally to a mount bushing for a vehicle and, more particularly, to a mount bushing configured to minimize frequency shifting according to difference of dynamic properties applied by a load input to a mount.

BACKGROUND OF THE INVENTION

A mount bushing is used in a vehicle, and generally, has an outer tube, an inner tube, and a rubber part provided between the outer tube and the inner tube, and a mass is provided in the rubber part to reinforce the rigidity of the mount bushing.

Specifically, in driving of an electric vehicle, as a Z-directional load is input to a mount by engine torque in response to a step degree of an accelerator, dynamic properties are also changed, and frequency of a first resonance around 500 Hz caused by the mass is shifted backward and the dynamic properties are also amplified, so that there is a problem in that the frequency shifting adversely affects vehicle noise, vibration, and harshness.

(Patent Document 1) KR10-1124595 B1.

SUMMARY OF THE INVENTION

Accordingly, the present disclosure has been made keeping in mind the above problem occurring in the related art, and the present disclosure is intended to provide a mount bushing configured to improve noise, vibration, harshness by minimizing shifting of frequency caused by a mass of the mount bushing even when a load in a main direction is applied to the mount bushing according to driving conditions of a vehicle and thus dynamic properties are changed according to a load size.

In order to achieve the above objective, according to one aspect of the present disclosure, there is provided a mount bushing including: an outer tube; an inner tube provided in the outer tube; a rubber part provided between the outer tube and the inner tube; a tubular mass provided in the rubber part and having an opening formed by partially penetrating an outer circumferential surface thereof; and a stopper shaped to protrude outward from the inner tube to pass through the opening of the tubular mass, wherein the mount bushing is configured to minimize mutual interference between the mass and the stopper in deformation due to an external force.

The rubber part may include: a center portion covering the mass, a first connecting portion connecting the center portion to the outer tube, and a second connecting portion connecting the center portion to the inner tube.

The mass may include: an auxiliary mass attached to the outer circumferential surface thereof.

The outer tube may include: a buffering rubber part provided at a location corresponding to the stopper.

According to the above solution, an effect can be expected as follows.

The mass and the stopper constituting the mount bushing are separated from each other as much as possible, so that peak frequency is maintained constant even when an external load varies. Therefore, noise, vibration, and harshness are prevented.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
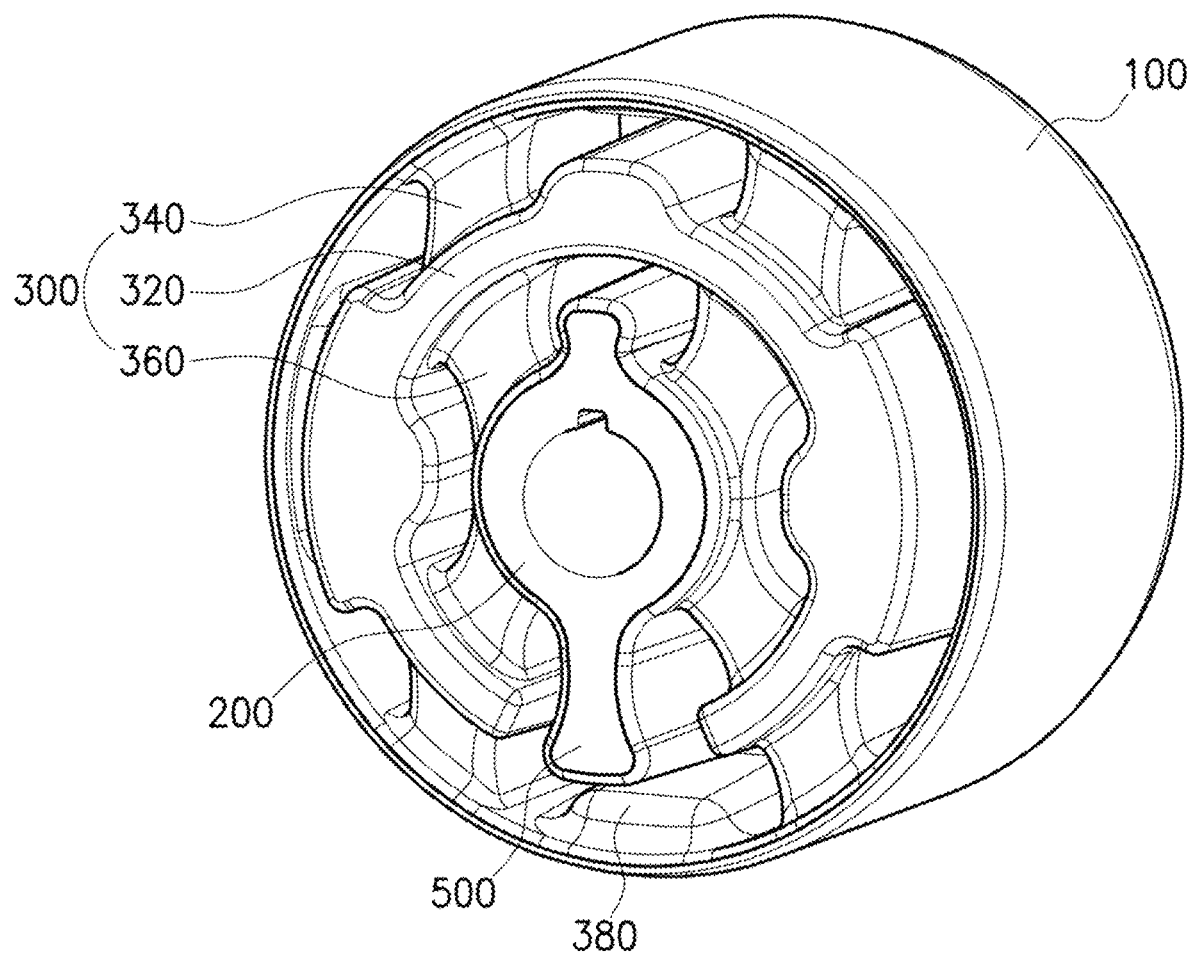
FIG. 1 is a perspective view showing a mount bushing according to an embodiment of the present disclosure.
Figure 2:
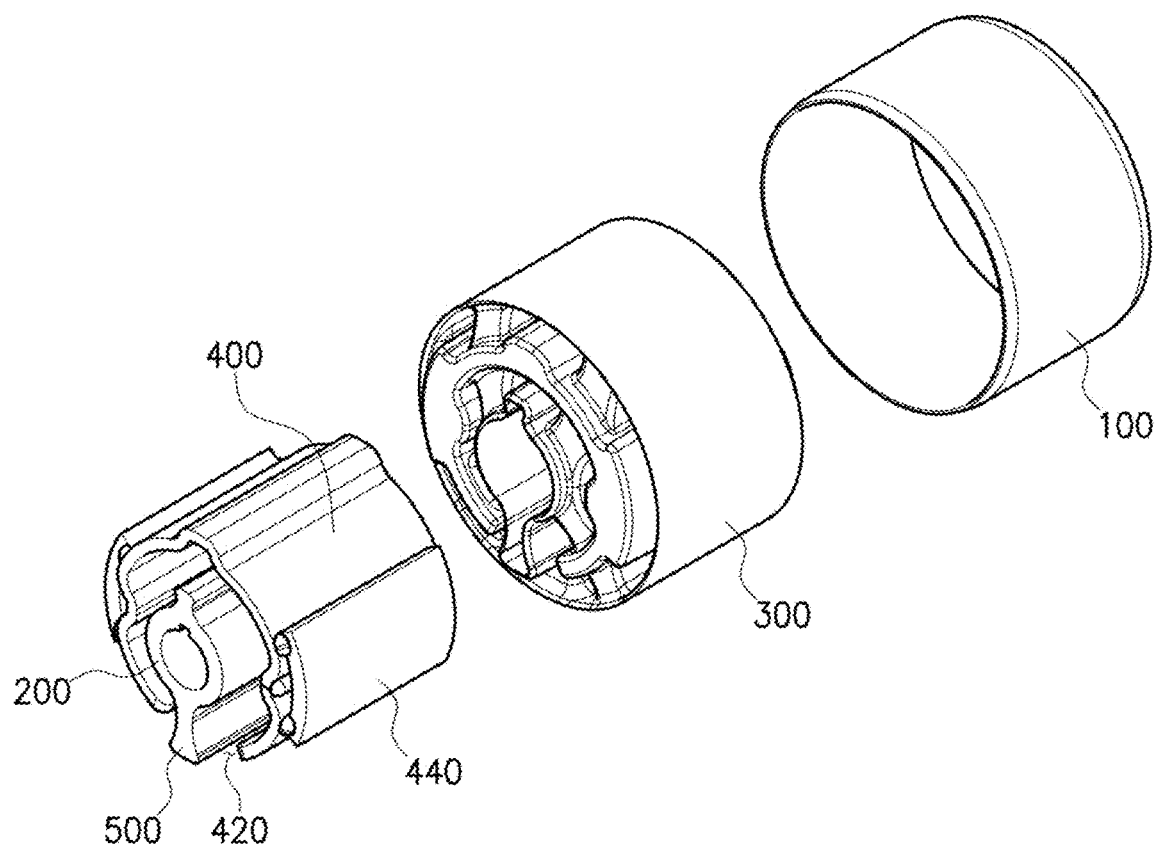
FIG. 2 is an exploded-perspective view showing the mount bushing according to the embodiment of the present disclosure.
Figure 3:
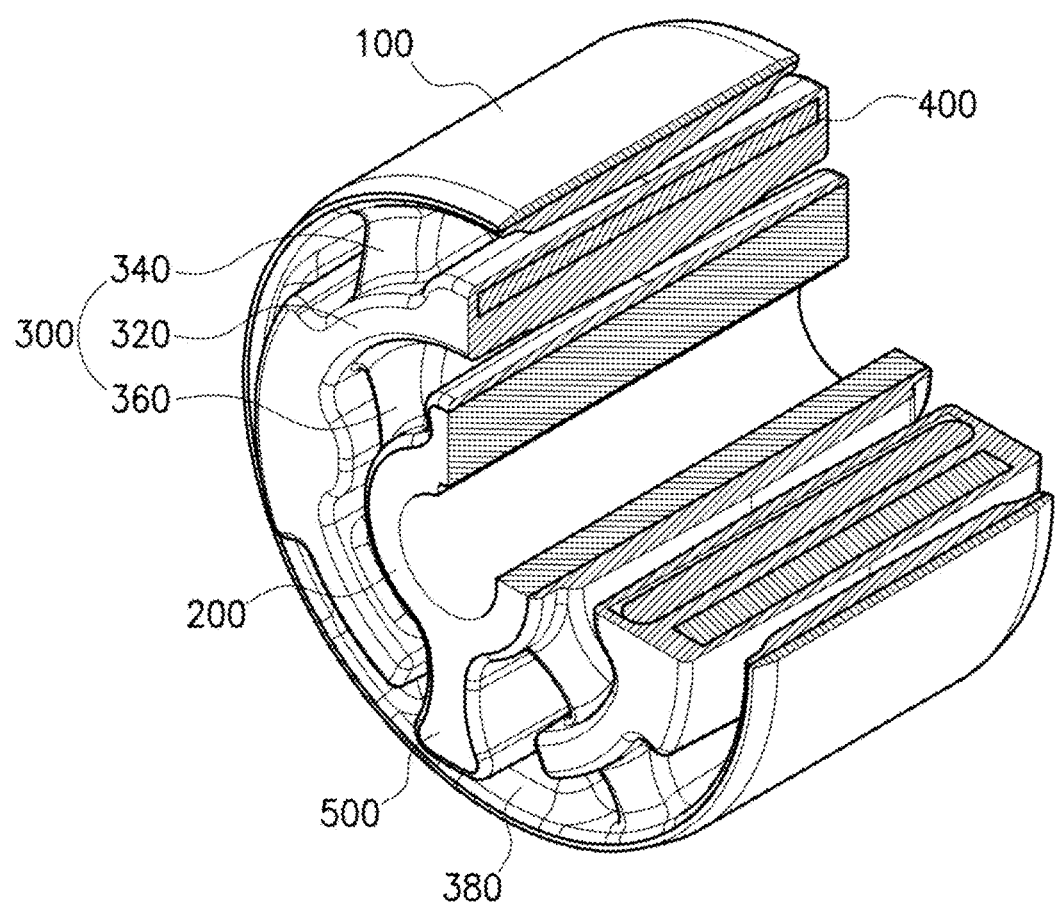
FIG. 3 is an inner structure view showing the mount bushing according to the embodiment of the present disclosure.
Figure 4:
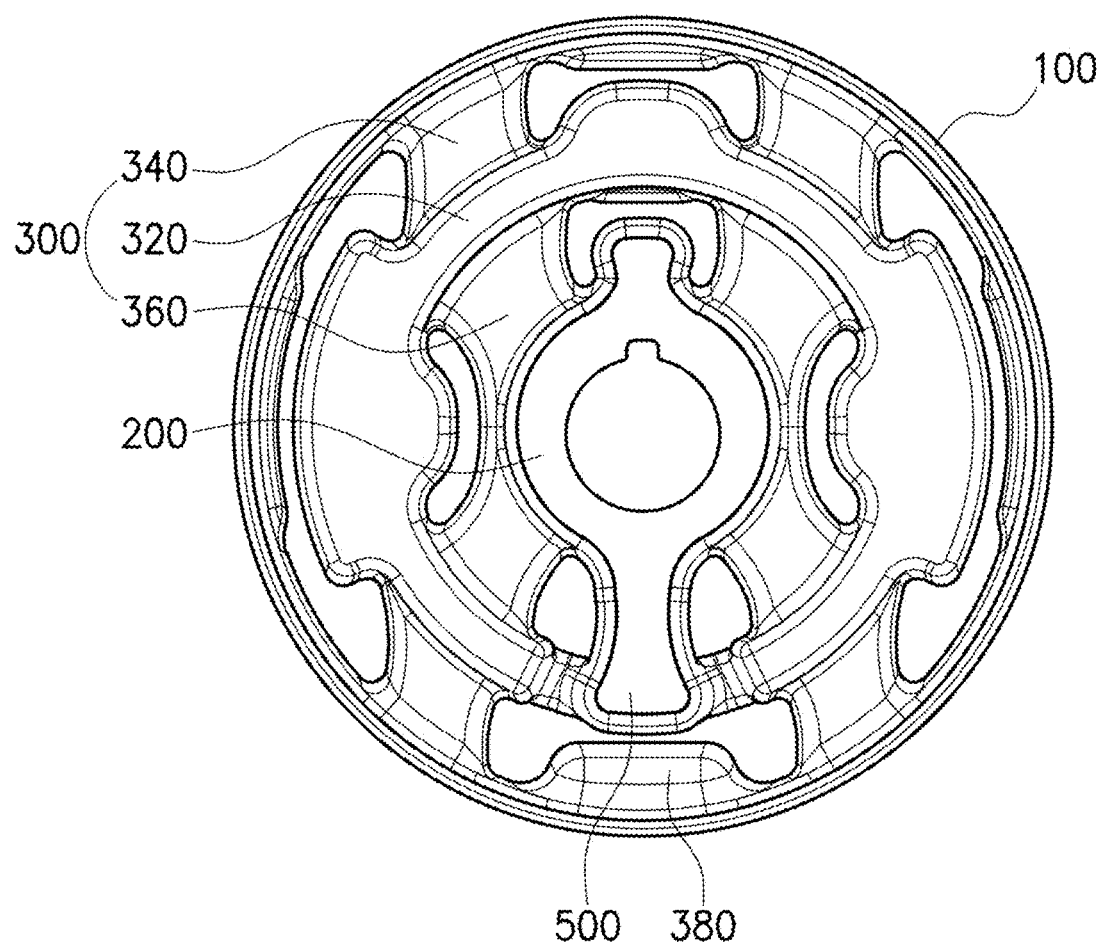
FIG. 4 is a front view showing the mount bushing according to the embodiment of the present disclosure.
Figure 5:
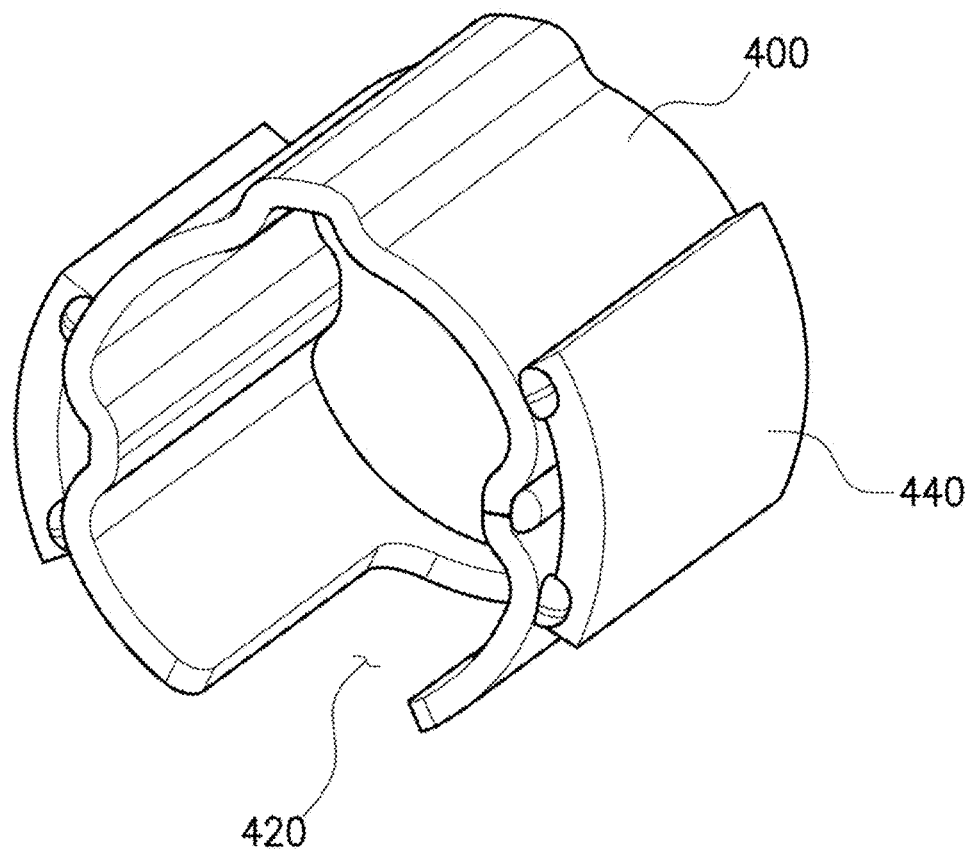
FIG. 5 is a view showing an example of a mass of the mount bushing according to the embodiment of the present disclosure.
Figure 6:
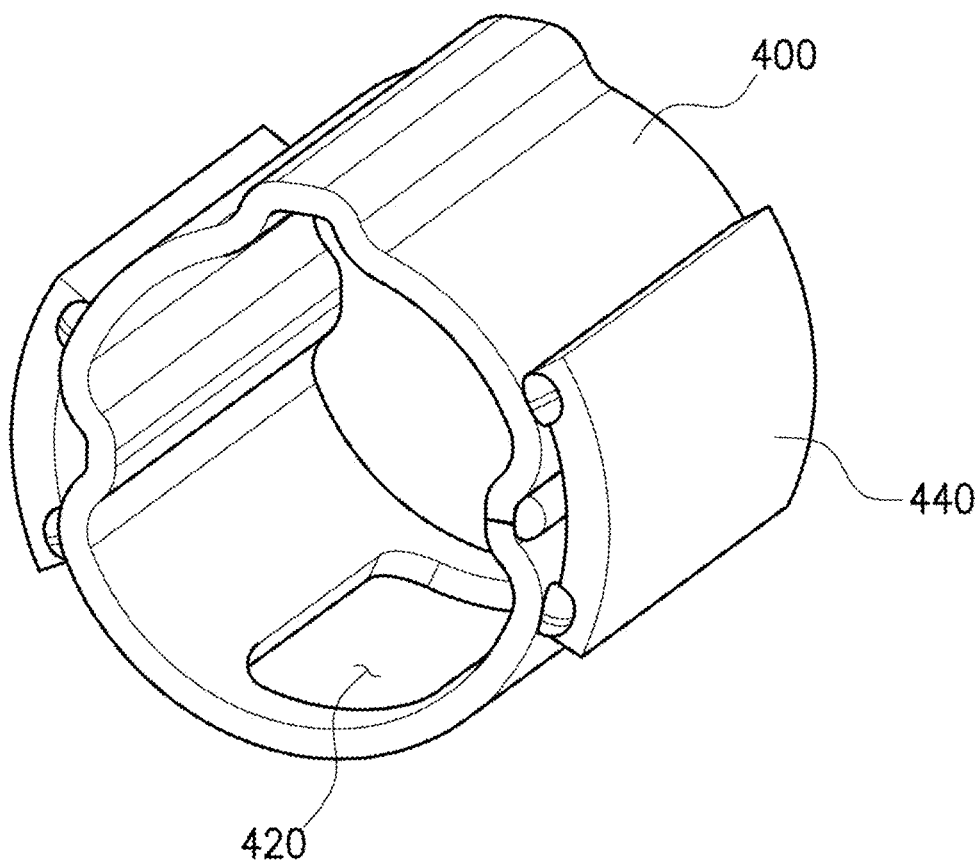
FIG. 6 is a view showing another example of the mass of the mount bushing according to the embodiment of the present disclosure.

Hereinbelow, an embodiment of the present disclosure will be described in detail with reference to accompanying drawings. The contents described hereinbelow and with reference to the accompanying drawings is presented for a general understanding of the present disclosure. The technical scope of the present disclosure is not limited thereto. Detailed descriptions of known functions and configurations which are deemed to make the gist of the present disclosure obscure will be omitted FIG. 1 is a perspective view showing a mount bushing according to an embodiment of the present disclosure. FIG. 2 is an exploded-perspective view showing the mount bushing according to the embodiment of the present disclosure. FIG. 3 is an inner structure view showing the mount bushing according to the embodiment of the present disclosure. FIG. 4 is a front view showing the mount bushing according to the embodiment of the present disclosure. FIG. 5 is a view showing an example of a mass of the mount bushing according to the embodiment of the present disclosure. FIG. 6 is a view showing another example of the mass of the mount bushing according to the embodiment of the present disclosure.

Figure 7A:
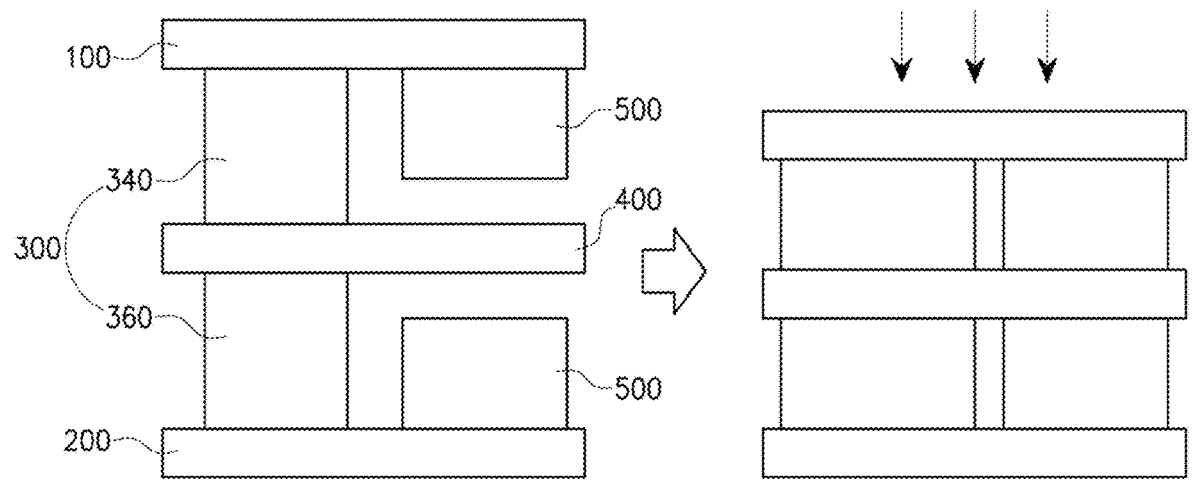
FIG. 7A is a state view showing deformation due to a load in a current mount bushing.
Figure 7B:
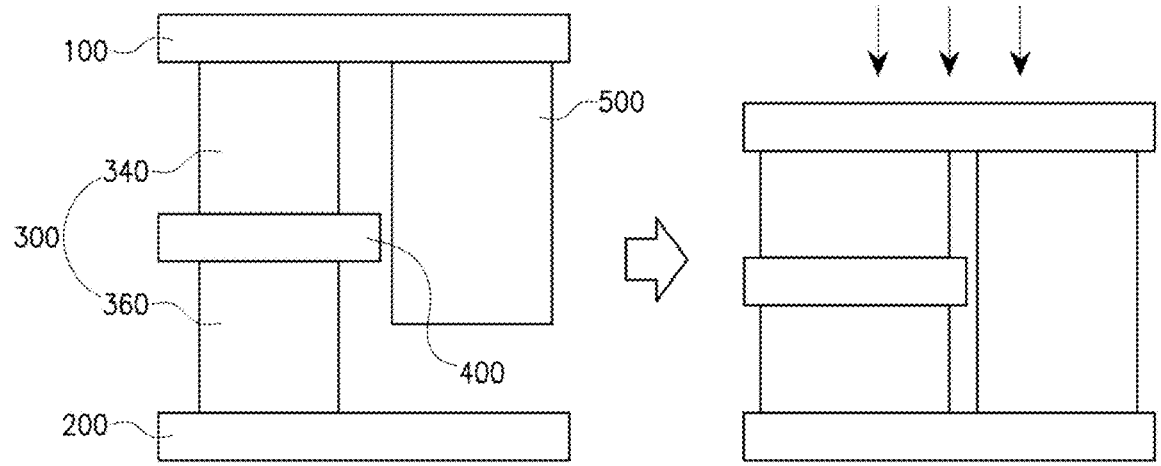
FIG. 7B is a state view showing deformation due to a load in the mount bushing according to the present disclosure.
Figure 8A:
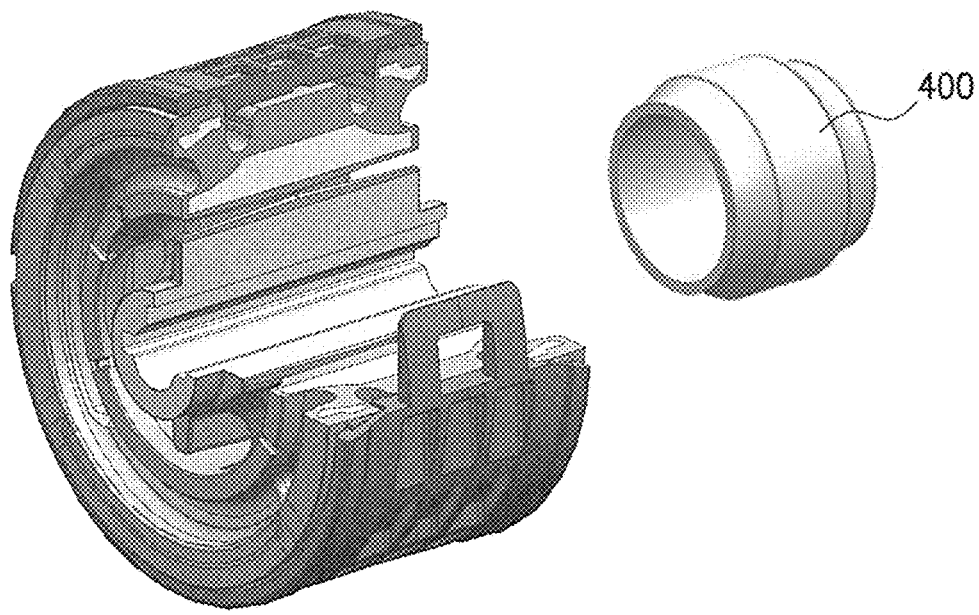
FIG. 8A is a frequency deformation graph of the current mount bushing.
Figure 8A:
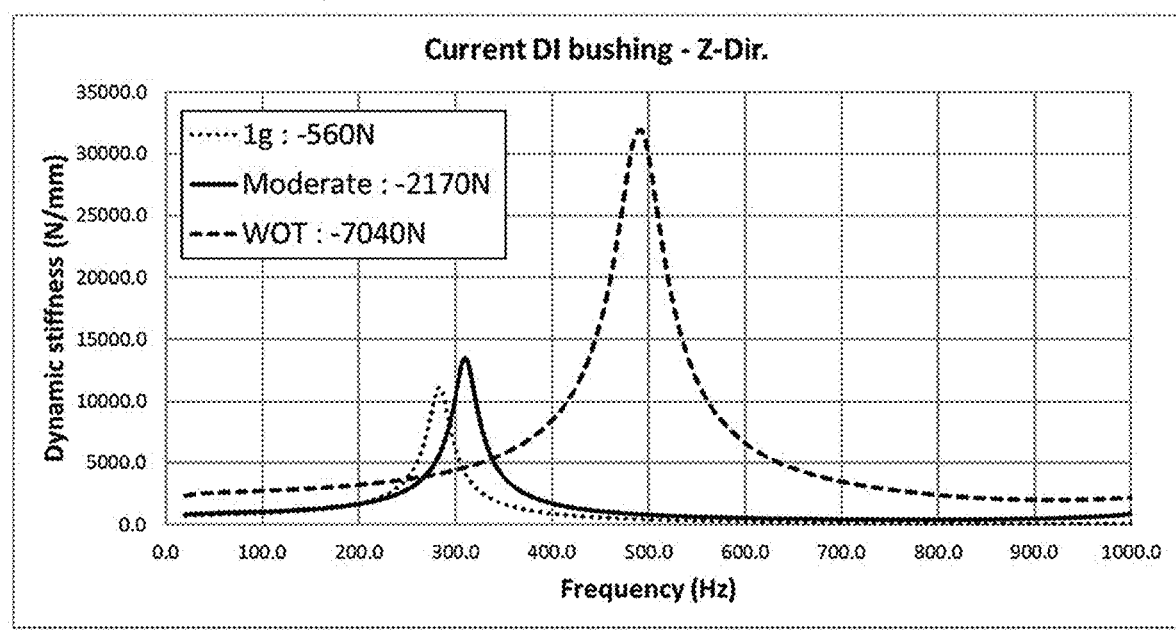
Figure 8B:
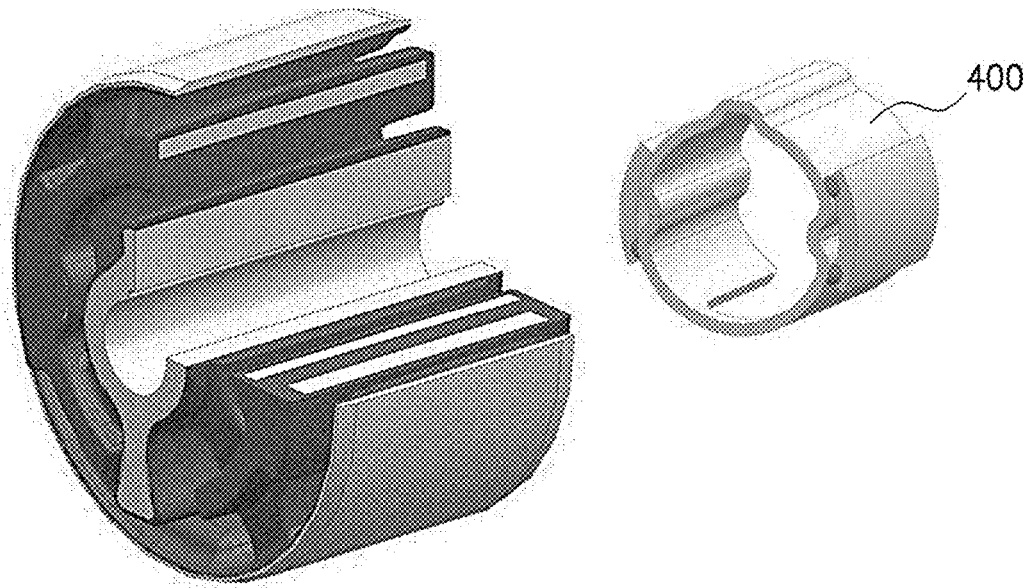
FIG. 8B is a frequency deformation graph of the mount bushing according to the present disclosure.
Figure 8B:
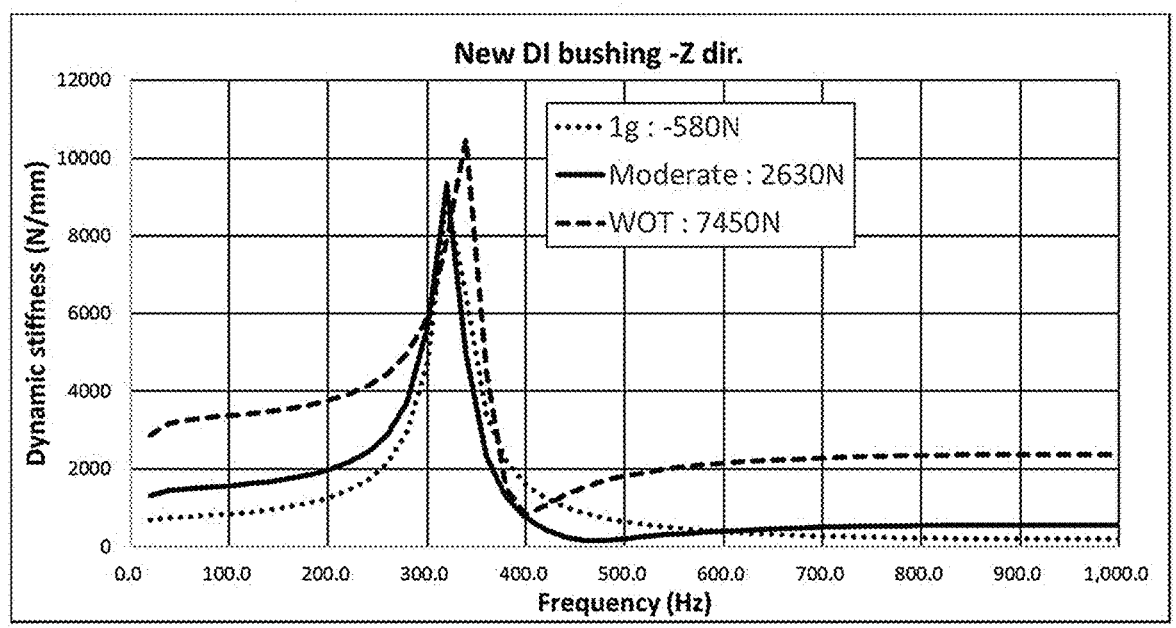

FIG. 7A is a state view showing deformation due to a load in a current mount bushing. FIG. 7B is a state view showing deformation due to a load in the mount bushing according to the present disclosure. FIG. 8A is a frequency deformation graph of the current mount bushing. FIG. 8B is a frequency deformation graph of the mount bushing according to the present disclosure.

Referring to FIGS. 1 to 4, the mount bushing according to the present disclosure includes an outer tube 100, an inner tube 200, a rubber part 300, a mass 400, and a stopper 500. The mount bushing of the present disclosure is configured to reduce mutual interference between the mass 400 and the stopper 500 when an external load is applied, thereby minimizing frequency shifting to reduce vehicle noise, vibration, and harshness.

Hereinbelow, each configuration of the present disclosure will be sequentially described.

First, the outer tube 100 corresponds to an outer form of the mount bushing, has a tubular shape, and may have a shape in which semicircular shapes are coupled to each other.

Next, the inner tube 200 is provided inside the outer tube 100 in a tubular shape.

Next, the rubber part 300 is provided between the outer tube 100 and the inner tube 200 and absorbs impacts and vibrations due to elasticity.

The rubber part 300 includes a ring-shaped center portion 320 covering the mass 400 therein, a plurality of first connecting portions 340 radially arranged to connect the center portion 320 to the outer tube 100, and a plurality of second connecting portions 360 radially arranged to connect the center portion 320 to the inner tube 200.

Each of the first connecting portions 340 may consist of a leg portion protruding outward from the center portion 320 at an interval and an outmost portion shaped to correspond to an inner circumferential surface of the outer tube 100. The second connecting portion 360 may consist of a leg portion protruding inward from the center portion 320 at an interval and an innermost portion shaped to correspond to an outer circumferential surface of the inner tube 200.

Next, the mass 400 is a portion provided in a tubular shape in the rubber part 300 and reinforcing the rigidity of the mount bushing. The mass 400 has an opening 420 formed by penetrating a part of an outer circumferential surface thereof. The opening 420 is a hall penetrating the outer circumferential surface in the tubular shape, and thus providing a moving path of the stopper 500, which will be described later.

The mass 400 may be conventionally used with a 'C' shape. However, the mount bushing of the present disclosure is reinforced in the rigidity with a leg connected to a first end of the mass in order to prevent resonance thereof from being generated, and a leg may be connected to a second end of the mass as shown in FIG. 6.

The mass 400 may include an auxiliary mass 440, which is attached to the outer circumferential surface thereof by welding, thereby increasing the weight of the mass. The mass 400 was produced by a pressing process considering a manufacturing cost in the present disclosure.

The stopper 500 is shaped to protrude outward from the inner tube 200 to pass through the opening 420 of the mass 400.

Therefore, in deformation due to an external force, the stopper 500 is moved while passing through the opening 420 of the mass 400 without direct contact with the mass 400 so that mutual interference between the stopper 500 and the mass 400 may be minimized, thereby minimizing amplification of frequency applied to the mass 400 to which a dynamic load is applied.

The outer tube 100 includes a buffering rubber part 380 at a location corresponding to the stopper 500 to absorb an impact of the stopper 500.

Next, FIGS. 7A to 8B are views showing comparison of a difference between the current mount bushing and the mount bushing of the present disclosure according to loads thereof.

In FIG. 7A, when a load is applied to the current mount bushing, the stopper 500 is brought in close contact with the mass 400, so that the mass 400 is influenced by the load. In FIG. 7B, when a load is applied to the mount bushing of the present disclosure, the stopper 500 allows the load not to be applied to the mass 400.

In FIG. 8A, when a load is input to the current mount bushing, dynamic properties are also changed, and frequency of a first resonance around 500 HZ caused by the mass is shifted backward and the dynamic properties are also amplified, thereby adversely affecting the vehicle noise, vibration, harshness (NVH).

However, as shown in FIG. 8B, the mount bushing of the present disclosure is configured to separate the mass from the stopper as much as possible, so that even when a Z-directional load is applied, there is an advantage of reducing NVH by reducing frequency shifting.

As described above, the present disclosure is a basic technical idea of the mount bushing, those skilled in the art will appreciate that various modifications, additions, and substitutions are possible, without departing from the spirit and scope of the present disclosure.

What is claimed is:

1. A mount bushing comprising:
    an outer tube;
    an inner tube provided in the outer tube;
    a rubber part provided between the outer tube and the inner tube, wherein the rubber part comprises a ring-shaped center portion, a first connecting portion connecting the center portion to the outer tube, and a second connecting portion connecting the center portion to the inner tube;
    a tubular mass embedded inside the ring-shaped center portion of the rubber part, wherein the tubular-mass embedded center portion includes an opening formed in a circumferential area thereof; and
    a stopper unitarily formed with the inner tube and protruded radially outwardly from the inner tube such that a distal end of the stopper is received in the opening of the tubular-mass embedded center portion,
    wherein the stopper is configured to move within the opening of the tubular-mass embedded center portion when an external load is applied to the mount bushing, while the stopper is limited from contacting the tubular mass to minimize frequence shifting in the mount bushing.

2. The mount bushing of claim 1, wherein the mass comprises:
    an auxiliary mass attached to an outer circumferential surface thereof.

3. The mount bushing of claim 1, wherein the outer tube comprises:
    a buffering rubber part protruding inwardly from an inner circumference of the outer tube at a location corresponding to the distal end of the stopper.

4. The mount bushing of claim 1, wherein the first connecting portion of the rubber part comprises a plurality of leg portions protruding outwardly from the center portion and configured to connect the center portion to the outer tube, and the second connecting portion of the rubber part comprises a plurality of leg portions protruding inwardly from the center portion and configured to connect the center portion to the inner tube.

\* \* \* \* \*